(12) United States Patent
Xie et al.

(10) Patent No.: US 11,954,011 B2
(45) Date of Patent: Apr. 9, 2024

(54) APPARATUS AND METHOD FOR EXECUTING CUSTOMIZED ARTIFICIAL INTELLIGENCE PRODUCTION LINE

(71) Applicant: BEIJING BAIDU NETCOM SCIENCE AND TECHNOLOGY CO., LTD., Beijing (CN)

(72) Inventors: Yongkang Xie, Beijing (CN); Ruyue Ma, Beijing (CN); Zhou Xin, Beijing (CN); Hao Cao, Beijing (CN); Kuan Shi, Beijing (CN); Yu Zhou, Beijing (CN); Yashuai Li, Beijing (CN); En Shi, Beijing (CN); Zhiquan Wu, Beijing (CN); Zihao Pan, Beijing (CN); Shupeng Li, Beijing (CN); Mingren Hu, Beijing (CN); Tian Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 275 days.

(21) Appl. No.: 17/627,090

(22) PCT Filed: Oct. 28, 2020

(86) PCT No.: PCT/CN2020/124460
§ 371 (c)(1),
(2) Date: Jan. 13, 2022

(87) PCT Pub. No.: WO2022/000888
PCT Pub. Date: Jan. 6, 2022

(65) Prior Publication Data
US 2022/0253372 A1    Aug. 11, 2022

(30) Foreign Application Priority Data
Jun. 30, 2020 (CN) .......................... 202010621819.5

(51) Int. Cl.
*G06F 9/44* (2018.01)
*G06F 8/20* (2018.01)
(Continued)

(52) U.S. Cl.
CPC ............ *G06F 11/3624* (2013.01); *G06F 8/20* (2013.01); *G06F 8/35* (2013.01); *G06F 8/433* (2013.01); *G06F 9/44505* (2013.01)

(58) Field of Classification Search
CPC .......... G06F 11/3624; G06F 8/20; G06F 8/35; G06F 8/433; G06F 9/44505
See application file for complete search history.

(56) References Cited

U.S. PATENT DOCUMENTS 10,620,923 B2    4/2020  Allan et al.
10,832,173 B1*  11/2020  Pistoia .................. G06F 40/216
(Continued)

FOREIGN PATENT DOCUMENTS

CN    106959851 A    7/2017
CN    107807814 A    3/2018
(Continued)

OTHER PUBLICATIONS

Xifan Yao, From Intelligent Manufacturing to Smart Manufacturing for Industry 4.0 Driven by Next Generation Artificial Intelligence and Further On, 2017, pp. 1-8. https://ieeexplore.ieee.org/stamp/stamp.jsp?tp=&arnumber=8119409 (Year: 2017).*

Resende, Luciano. "IBM announces Elyra AI Toolkit, a set of AI-centric extensions to Jupyter Notebooks," *IBM Developer Blog* (Apr. 29, 2020) (available at: https://developer.ibm.com/blogs/open-source-elyra-ai-toolkit-simplifies-data-model-developemnt/) (downloaded on Jan. 13, 2022).
(Continued)

*Primary Examiner* — Mongbao Nguyen
(74) *Attorney, Agent, or Firm* — Leydig, Voit & Mayer, Ltd.

(57) ABSTRACT

An apparatus and a method for executing a customized production line using an artificial intelligence development platform, a computing device and a computer readable storage medium are provided. The apparatus includes: a
(Continued)

production line executor configured to generate a native form of the artificial intelligence development platform based on a file set, the native form to be sent to a client accessing the artificial intelligence development platform so as to present a native interactive page of the artificial intelligence development platform; and a standardized platform interface configured to provide an interaction channel between the production line executor and the artificial intelligence development platform. The production line executor is further configured to generate an intermediate result by executing processing logic defined in the file set and to process the intermediate result by interacting with the artificial intelligence development platform via the standardized platform interface.

17 Claims, 7 Drawing Sheets

(51) Int. Cl.
*G06F 8/35* (2018.01)
*G06F 8/41* (2018.01)
*G06F 9/445* (2018.01)
*G06F 9/455* (2018.01)
*G06F 11/36* (2006.01)

(56) References Cited

U.S. PATENT DOCUMENTS

| 10,956,833 | B1* | 3/2021 | Yamane | G06F 8/77 |
| 11,748,128 | B2* | 9/2023 | Chakraborti | G06N 5/043 |
| | | | | 717/151 |
| 2021/0191718 | A1* | 6/2021 | Draude | G06F 8/77 |

FOREIGN PATENT DOCUMENTS

| CN | 108874268 A | | 11/2018 |
| CN | 108876435 A | | 11/2018 |
| CN | 110209574 A | * | 9/2019 |
| CN | 110489093 A | | 11/2019 |
| CN | 110780861 A | | 2/2020 |
| CN | 110795095 A | | 2/2020 |
| CN | 111782184 A | | 10/2020 |
| JP | H10105410 A | | 4/1998 |
| JP | 2019-3603 A | | 1/2019 |

OTHER PUBLICATIONS

"Usage of Alibaba Cloud machine learning platform—rapid application of collaborative filtering recommendation algorithm" (Apr. 13, 2016).
"Creating Artificial Intelligence" Deep Learning Image Recognition System, pp. 31-35 (Dec. 2016).

* cited by examiner

APPARATUS AND METHOD FOR EXECUTING CUSTOMIZED ARTIFICIAL INTELLIGENCE PRODUCTION LINE

CROSS REFERENCE TO RELATED APPLICATIONS

The present application is a 35 U.S.C. 371 national phase application of International Application No. PCT/CN2020/124460, filed on Oct. 28, 2020, which claims priority to Chinese Patent Application No. 202010621819.5, field on Jun. 30, 2020. The entire contents of the aforementioned applications are hereby incorporated by reference in their entireties for all purposes.

TECHNICAL FIELD

The present disclosure relates to artificial intelligence and a cloud platform, and more specifically, to an apparatus and method for executing a customized production line using an artificial intelligence development platform, a computing device and a computer readable storage medium.

BACKGROUND

An artificial intelligence (AI) production line (i.e., artificial intelligence development process) may realize different artificial intelligence development functions such as image recognition, image processing, character recognition, speech recognition, object detection and the like. By using the pre-defined artificial intelligence production line deployed at the side of the artificial intelligence development platform (for example, EasyDL, ModelArts, AWS Sagemaker and the like), developers can combine, for example, an end-to-end pre-training model with user's scenario data so as to obtain the required artificial intelligence training models. The artificial intelligence production line may also be built by the developers themselves.

SUMMARY

According to an aspect of the present disclosure, an apparatus for executing a customized production line using an artificial intelligence development platform is provided, wherein the customized production line is an additional development process that is different from a pre-defined development process of the artificial intelligence development platform and the additional development process is defined by a file set. The apparatus includes: a production line executor configured to generate a native form of the artificial intelligence development platform based on the file set, wherein the native form is to be sent to a client accessing the artificial intelligence development platform so as to present a native interactive page of the artificial intelligence development platform; and a standardized platform interface configured to provide an interaction channel between the production line executor and the artificial intelligence development platform, wherein the production line executor is further configured to generate an intermediate result by executing processing logic, defined in the file set, corresponding to an operation event on the native interactive page and process the intermediate result by interacting with the artificial intelligence development platform via the standardized platform interface so as to execute the additional development process.

According to another aspect of the present disclosure, a method for executing a customized production line using an artificial intelligence development platform is provided, wherein the customized production line is an additional development process that is different from a pre-defined development process of the artificial intelligence development platform and wherein the additional development process is defined by a file set. The method includes: providing a production line executor configured to generate a native form of the artificial intelligence development platform based on the file set, wherein the native form is to be sent to a client accessing the artificial intelligence development platform so as to present a native interactive page of the artificial intelligence development platform; and providing a standardized platform interface configured to provide an interaction channel between the production line executor and the artificial intelligence development platform, wherein the production line executor is further configured to generate an intermediate result by executing processing logic, defined in the file set, corresponding to an operation event on the native interactive page and process the intermediate result by interacting with the artificial intelligence development platform via the standardized platform interface so as to execute the additional development process.

According to yet another aspect of the present disclosure, a computing device is provided for executing a customized production line using an artificial intelligence development platform, wherein the customized production line is an additional development process that is different from a pre-defined development process of the artificial intelligence development platform and the additional development process is defined by a file set. The computing device includes: a processor; and a memory having instructions stored thereon, wherein the instructions may be executed by the processor for: implementing a production line executor configured to generate a native form of the artificial intelligence development platform based on the file set, wherein the native form is to be sent to a client accessing the artificial intelligence development platform so as to present a native interactive page of the artificial intelligence development platform; and implementing a standardized platform interface configured to provide an interaction channel between the production line executor and the artificial intelligence development platform, wherein the production line executor is further configured to generate an intermediate result by executing processing logic, defined in the file set, corresponding to an operation event on the native interactive page and process the intermediate result by interacting with the artificial intelligence development platform via the standardized platform interface so as to execute the additional development process.

According to still another aspect of the present disclosure, a computer readable storage medium is provided for executing a customized production line using an artificial intelligence development platform, wherein the customized production line is an additional development process that is different from a pre-defined development process of the artificial intelligence development platform and the additional development process is defined by a file set. The computer readable storage medium has instructions stored thereon, wherein the instructions may be executed by a processor for: implementing a production line executor configured to generate a native form of the artificial intelligence development platform based on the file set, wherein the native form is to be sent to a client accessing the artificial intelligence development platform so as to present a native interactive page of the artificial intelligence development platform; and implementing a standardized platform interface configured to provide an interaction channel between the production line executor and the artificial intelligence development platform, wherein the production line executor is further configured to generate an intermediate result by executing processing logic, defined in the file set, corresponding to an operation event on the native interactive page and process the intermediate result by interacting with the artificial intelligence development platform via the standardized platform interface so as to execute the additional development process.

According to some embodiments of the present disclosure, by executing the customized artificial intelligence production line with native interactive experience of the platform on an existing artificial intelligence development platform, the development functions that can be provided by the existing artificial intelligence development platform can be rapidly expanded, the utilization rate of the existing artificial intelligence development platform infrastructure can be increased, and the value of the existing artificial intelligence development platform infrastructure and service can by fully exerted. Furthermore, compared with the pre-defined artificial intelligence production line of the platform, the customized artificial intelligence production line is often more suitable for the specific application scenarios of consumers, thereby enabling the consumers to accelerate the customization of the required artificial intelligence model.

BRIEF DESCRIPTION OF THE DRAWINGS

The accompanying drawings illustrate some embodiments and form a part of the specification, and serve to explain the example implementations of the embodiments together with the textual description of the specification. The embodiments shown are merely for illustrative purposes and do not limit the scope of the claims. Throughout the accompanying drawings, the same reference numerals refer to similar but not necessarily identical elements.

DETAILED DESCRIPTION OF EMBODIMENTS

Figure 1:
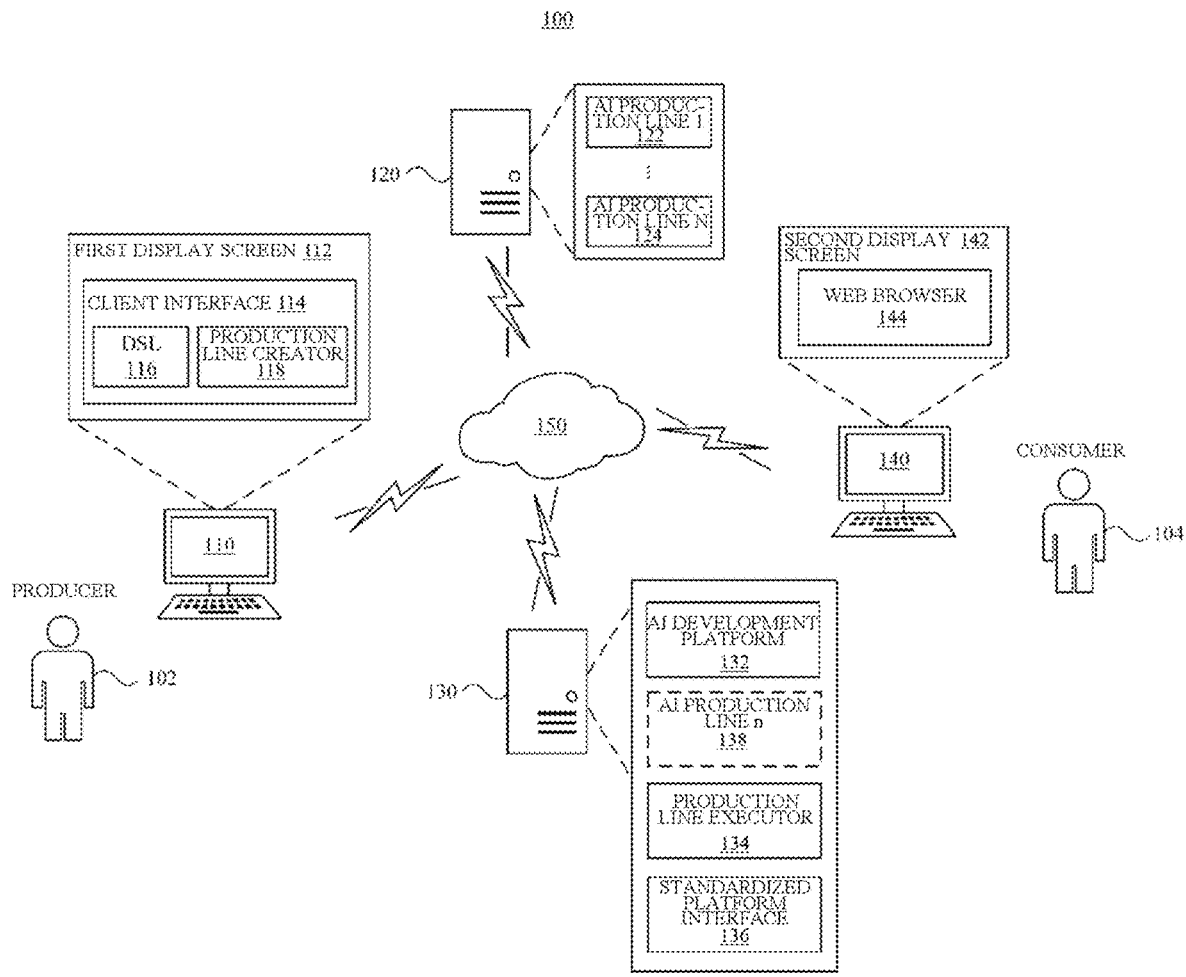
FIG. 1 is a schematic diagram illustrating an example system in which various apparatuses described herein can be applied according to an example embodiment of the present disclosure.

In the present disclosure, unless otherwise specified, the terms "first", "second" and the like used to describe various elements are not intended to limit the positional relationship, the timing relationship or the importance relationship of the elements. Such terms are merely for distinguishing one component from another. In some examples, a first element and a second element may refer to the same instance of the element, whereas in some cases, they may also refer to different instances based on the contextual description.

The terms used in the description of various examples in the present disclosure are only for describing specific examples and are not intended to limit the present disclosure. Unless otherwise clearly indicated in the context, if the number of the elements is not specifically limited, there may be one or more elements. In addition, the term "and/or" used in the present disclosure covers any and all possible combinations of the listed items.

An existing artificial intelligence development platform provides a pre-defined artificial intelligence production line, which may provide an easy-to-use and one-stop development function for developers such as intelligent labeling, model training, service deployment and the like. However, since the artificial intelligence production line is pre-defined by the platform, external developers, especially ecological enterprise developers, may not customize the development process according to the characteristics of their own scenarios and tasks, which restricts the ability of the existing artificial intelligence development platform to combine with scenarios. For example, for the scenario of shelf commodity inspection in the retail industry, not only a pre-trained detection model is required, but also scenario data, a standard stock keeping unit and shelf data need to be combined to form a customized training data set and a customized training model. Moreover, for classification of large-scale shelf commodity, not only a detection model, but also a recognition model are required to realize the above functions. These functions cannot be realized by the pre-defined artificial intelligence production line of the platform. Therefore, subject to the understanding of the scenarios by platform technicians, the scenarios that can be covered by the pre-defined artificial intelligence production line are often limited.

In addition, it takes a lot of research and development resources for the platform to provide the pre-defined artificial intelligence production line. The research and development of a complete artificial intelligence development process involves the collaboration of different research and development roles at front and back ends, which needs a long cycle and a lot of research and development manpower investment. Moreover, the artificial intelligence production line built by one platform often cannot be reused due to the lack of the unified standard execution environment and service interface, and additional research and development manpower is still required for modification and adaptation.

Developers may also build their own artificial intelligence production lines. The developers may use open-source frameworks, tools and the like in combination with a certain general programming language to generate customized artificial intelligence production lines based on the own scenario requirements. However, such self-built artificial intelligence production lines cannot be circulated in a larger ecological scope, cannot play a greater value in similar scenarios except meeting the needs of the developers themselves, and moreover, are difficult to combine with the intellectual resources of the ecological community to realize upgrade and improvement.

In view of the above technical problems, embodiments of the present disclosure provide an apparatus and method for executing a customized production line using an artificial intelligence development platform, a computing device and a computer readable storage medium. In the following description, two terms will be involved:
(1) producer: the role of creating and releasing an AI production line (that is, AI development process).
(2) consumer: the developer who uses the AI production line created and released by the producer for model customization, generally the user of the existing AI development platform.

The apparatus provided by the embodiment of the present disclosure includes a production line executor, which may generate, based on the artificial intelligence production line created by the producer, a native form corresponding to the artificial intelligence development platform to present a native interactive page to the consumer and provide an environment for executing the native form. The apparatus further includes a standardized platform interface, via which interaction between the production line executor and the artificial intelligence development platform may be implemented, thereby enabling the consumer to have the interactive experience of the native form. It will be understood that the term "native form" or "native interactive page" means that they have the same or similar appearance as the form or interactive page generated by the artificial intelligence development platform to which the customized production line is attached, so that for the consumer, they look as if they were originally generated by the artificial intelligence development platform.

According to some embodiments of the present disclosure, by executing the customized artificial intelligence production line with native interactive experience of the platform on an existing artificial intelligence development platform, the development functions that can be provided by the existing artificial intelligence development platform can be rapidly expanded, the utilization rate of the existing artificial intelligence development platform infrastructure can be increased, and the value of the existing artificial intelligence development platform infrastructure and service can by fully exerted. Furthermore, compared with the predefined artificial intelligence production line of the platform, the customized artificial intelligence production line is often more suitable for the specific application scenarios of consumers, thereby enabling the consumers to accelerate the customization of the required artificial intelligence model. In addition, due to the native interactive experience of the platform, when the consumers use the customized artificial intelligence production lines through the existing artificial intelligence development platform, these customized artificial intelligence production lines are as if they were native to the platform. This allows the customized artificial intelligence production line to circulate in a larger ecological scope through the existing artificial intelligence development platform, thereby increasing the own utilization rate. With the intellectual resources of the ecological community of the existing artificial intelligence development platform, these customized artificial intelligence production lines may be upgraded and improved. In some embodiments, a production line creator is further provided, which enables ecological developers to participate in the process of creating new artificial intelligence production lines for the existing artificial intelligence development platform. These new artificial intelligence production lines can better adapt to the requirements of the specific application scenarios, and also expand the development functions that can be provided by the existing artificial intelligence development platform, thereby greatly improving the research and development efficiency of the customized artificial intelligence development process.

The embodiments of the present disclosure will be described in detail below with reference to the accompanying drawings.

FIG. 1 illustrates a schematic diagram of an example system 100 in which apparatuses described herein can be applied according to an example embodiment of the present disclosure.

Referring to FIG. 1, the example system includes: a first client device 110 associated with a producer 102, a first server 120, a second server 130, a second client device 140 associated with a consumer 104, and a network 150 that communicatively couples the first client device 110, the first server 120, the second server 130 and the second client device 140.

The first client device 110 includes a first display screen 112 and a client interface 114 that may be displayed via the first display screen 112. As will be described below, the producer 102 may interact with the first server 120 through the client interface 114, for example, may operate in the client interface 114 with a domain-specific language (DSL) 116, a production line creator 118 and the like (the rest are not shown) so as to send the created artificial intelligence production line to the first server 120 and/or receive data from the first server 120. The first client device 110 may be any type of mobile computing devices, including a mobile computer or a mobile computing device (for example, a Microsoft® Surface® device, a personal digital assistant (PDA), a laptop computer, a notebook computer, a tablet computer such as Apple iPad™, a netbook and the like), a mobile phone (for example, a cell phone, a smart phone such as a Microsoft Windows® phone, Apple iPhone, a phone that implements a Google® Android™ operating system, a Palm® device, a Blackberry® device and the like), a wearable computing device (for example, a smartwatch, a head-mounted device including smart glasses, such as Google® Glass™, and the like) or other types of mobile devices. In some embodiments, the client device 110 may also be a fixed computing device.

The first server 120 is typically background server(s) deployed by an Internet service provider (ISP) or an Internet content provider (ICP), on which a background application (not shown) may run. The background application interacts with the client interface 114 on the first client device 110 and a background application residing on the second server 130. According to some embodiments, upload, storage and distribution of the artificial intelligence production line may be implemented by the interaction. The producer 102 may create a first artificial intelligence production line 122 to an N-th artificial intelligence production line 124 by operating in the client interface 114 with the DSL 116, the production line creator 118 and the like. Through the network 150, the first artificial intelligence production line 122 to the N-th artificial intelligence production line 124 may be uploaded from the first client device 110 to the first server 120 and stored in the first server 120. In such an embodiment, the first artificial intelligence production line 122 to the N-th artificial intelligence production line 124 may be artificial intelligence production lines for implementing functions, including but not limited to image recognition, image processing, character recognition, speed recognition, object detection and the like. As will be further described below, in some embodiments of the present disclosure, the artificial intelligence production line may be created by editing a DSL code and/or other controls in the production line creator 118.

The second server 130 is also background server(s) deployed by an Internet service provider (ISP) or an Internet content provider (ICP), which interacts with the first server 120 and the second client 140. According to some embodiments, an artificial intelligence development platform 132, a production line executor 134, a standardized platform interface 136 and an n-th artificial intelligence production line 138 are deployed at the side of the second server 130. The n-th artificial intelligence production line 138 may be any one of the first artificial intelligence production line 122 to the N-th artificial intelligence production line 124 stored in the first server 120. An additional customized artificial intelligence development function may be provided for the artificial intelligence development platform 132 through the n-th artificial intelligence production line 138. The first server 120 and the second server 130 typically have a large amount of computing and storage resources, but other embodiments are also possible.

The second client 140 includes a second display screen 142 and a web browser 144 that may be displayed via the second display screen 142. As will be described below, the consumer 104 may access the artificial intelligence development platform 132 and the n-th artificial intelligence production line 138 deployed at the side of the second server 130 through the web browser 144. The second client 140 may be any type of mobile computing devices as the first client 110 and may also be a fixed computing device, which is not described in detail here.

Each of the first client device 110, the first server 120, the second server 130 and the second client device 140 may include at least one communication interface (not shown) that is capable of communicating through the network 150. Such a communication interface may be one or more of: any type of network interface (for example, a network interface card (NIC)), a wired or wireless (such as IEEE 802.11 wireless LAN (WLAN)) interface, a worldwide interoperability for microwave access (Wi-MAX) interface, an Ethernet interface, a universal serial bus (USB) interface, a cellular network interface, a Bluetooth™ interface, a near-field communication (NFC) interface and the like. Other examples of the communication interface are described elsewhere in the description.

An example of the network 150 includes a local area network (LAN), a wide area network (WAN), a personal area network (PAN), and/or a combination of communication networks such as the Internet.

Figure 2:
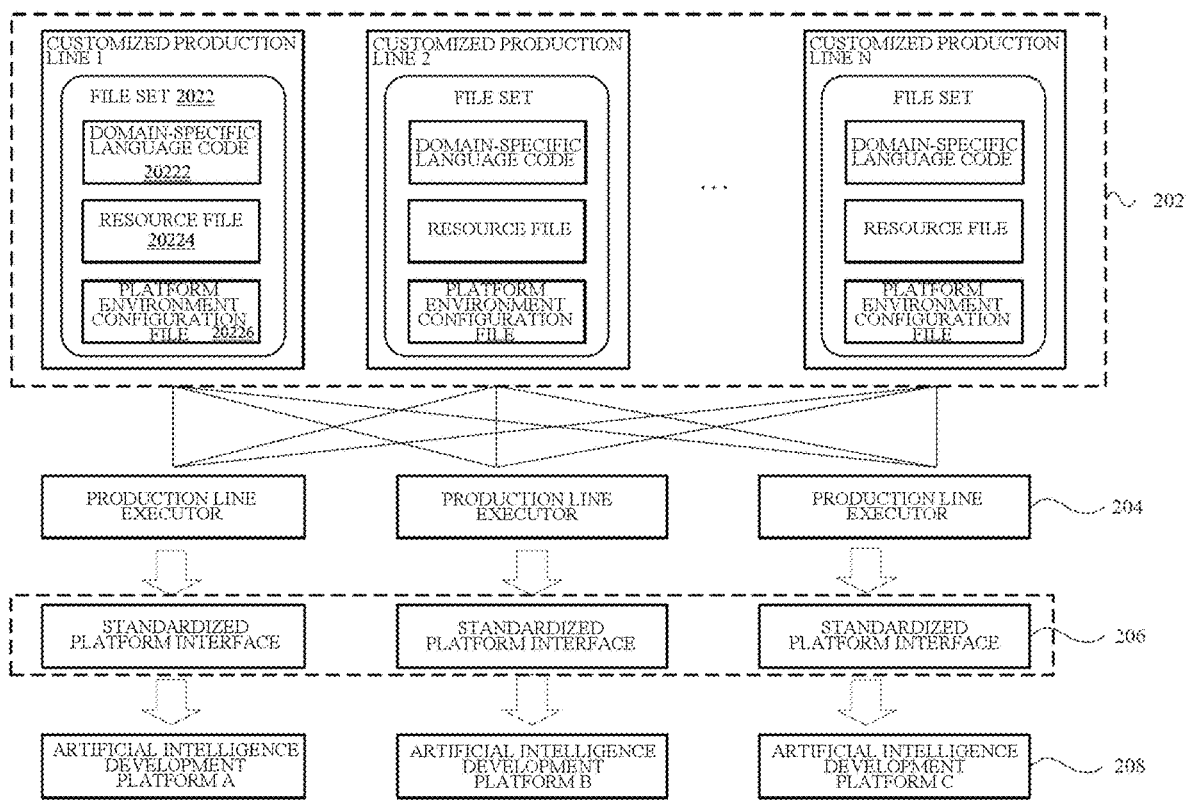
FIG. 2 is a structural block diagram illustrating an apparatus for executing a customized production line using an artificial intelligence development platform according to an example embodiment of the present disclosure.

In the embodiment, the system 100 in FIG. 1 may be configured in various ways, and may be operated in various ways, so that the apparatus and method described in the present disclosure can be applied. For example, FIG. 2 illustrates a structural block diagram of an apparatus 200 for executing a customized production line using an artificial intelligence development platform according to an example embodiment of the present disclosure. In FIG. 2, the customized production line 202 is an additional development process that is different from a pre-defined development process of the artificial intelligence development platform. The additional development process is defined by a file set 2022. In this embodiment, the system 100 may be configured according to the apparatus 200.

Referring to FIG. 2, the apparatus 200 includes a production line executor 204 and a standardized platform interface 206. The production line executor 204 is configured to generate, based on the file set 2022, a native form of an artificial intelligence development platform 208. The native form is to be sent to a client accessing the artificial intelligence development platform 208 so as to present a native interactive page of the artificial intelligence development platform 208. The standardized platform interface 206 is configured to provide an interaction channel between the production line executor 204 and the artificial intelligence development platform 208. The production line executor 204 is further configured to generate an intermediate result by executing processing logic, defined in the file set 2022, corresponding to an operation event on the native interactive page, and process the intermediate result by interacting with the artificial intelligence development platform 208 via the standardized platform interface 206 so as to execute the additional development process.

According to some embodiments of the present disclosure, the file set 2022 for defining each of the customized production lines 202 includes a domain-specific language code 20222, a resource file 20224 and a platform environment configuration file 20226. The domain-specific language code 20222 includes a code that is described with a domain-specific language for implementing processing logic of the additional development process. For example, the domain-specific language may be an internal domain-specific language that is expanded based on a common cross-domain general programming language (GPL) (for example, C language, C++ language, Java language, Python and the like) and requires to be additionally packaged at runtime, or an independent external domain-specific language (for example, JSX language and the like). The resource file 20224 includes style sheets and pictures required for presenting the native interactive page. For example, through the resource file 20224, the native interactive page may be statically revised or modified, and various elements in the native interactive page may also be formatted in combination with a script language. The platform environment configuration file 20226 includes configuration parameters, specific to the additional development process, for the artificial intelligence development platform 208, such as a data storage path, a model acquisition path and the like.

According to some embodiments of the present disclosure, the domain-specific language code 20222 includes code logic for executing at least one of: form control event response, multi-source training data processing and multi-model fusion calculation. For example, the consumer may execute operations such as filling in and submitting the form through operations (for example, inputting user basic information in a text box, inputting a password in a password box, clicking a submit button or a clear button to submit or clear information on the form respectively, and the like) on the form control at the web browser. In response to the above operations, functions corresponding to the above operations may be implemented by executing corresponding codes in the domain-specific language codes. For example, in the above described scenario of retail shelf commodity inspection, series execution of a detection model and a recognition model may be implemented by the domain-specific language code.

Although the domain-specific language code described herein includes code logic corresponding to three operations of form control event response, multi-source training data processing and multi-model fusion calculation, it should be understood that the domain-specific language code may further include any other code logic related to the artificial intelligence production line, such as code logic for implementing functions such as model effect evaluation and model verification.

Figure 3:
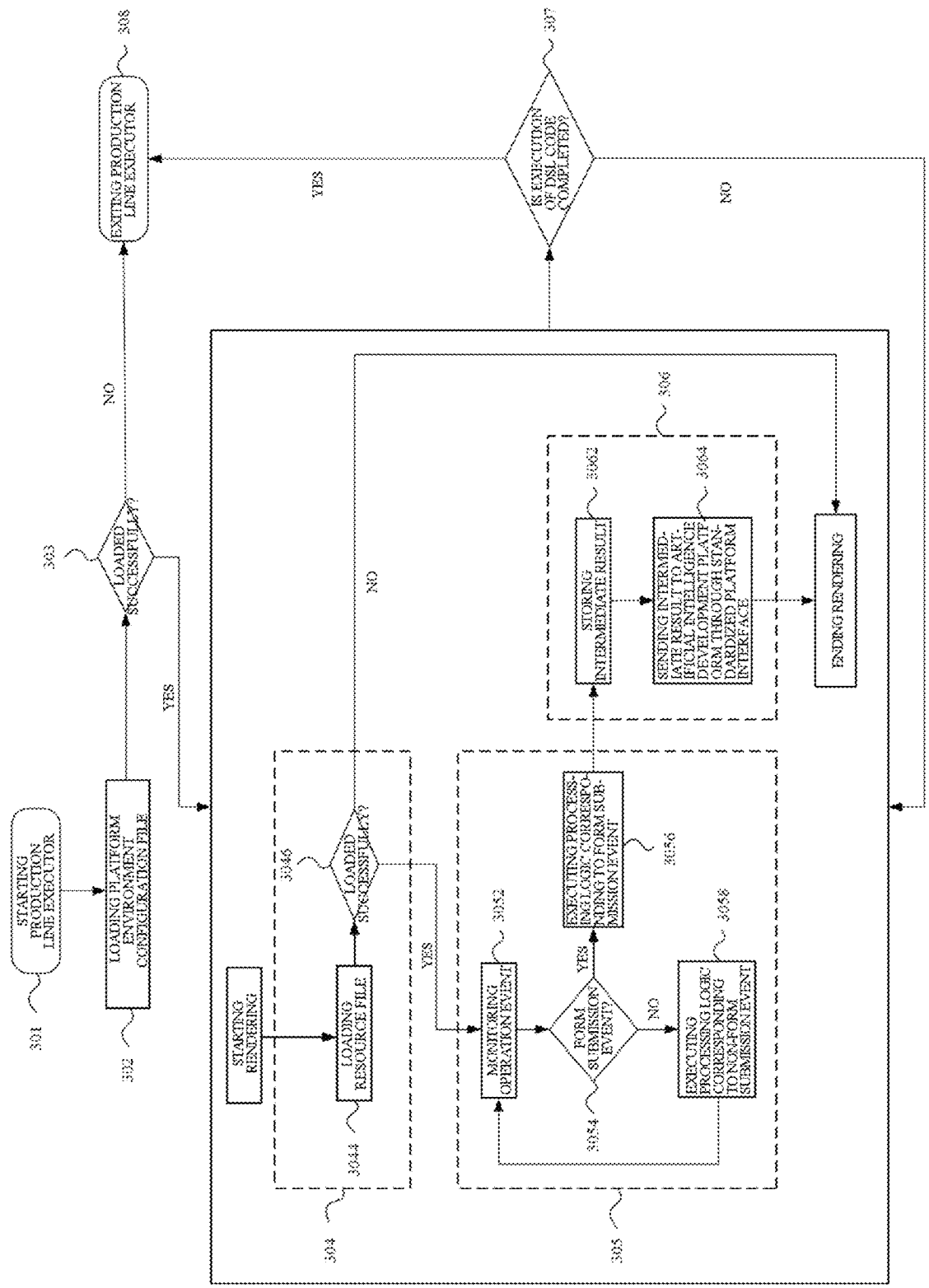
FIG. 3 is a flow chart illustrating executing a production line executor according to an example embodiment of the present disclosure.

FIG. 3 illustrates an overall flowchart that the production line executor 204 of the apparatus 200 in FIG. 2 generates the native form of the artificial intelligence development platform, generates the intermediate result and processes the intermediate result according to an example embodiment of the present disclosure.

Referring to FIG. 3, the production line executor is configured to execute the following operations: starting (301) the production line executor and loading (302) the platform environment configuration file in response to receiving a request from the second client so as to configure the artificial intelligence development platform according to the configuration parameter included in the platform environment configuration file; determining (303) whether the platform environment configuration file is loaded successfully; in response to determining that the platform environment configuration file is loaded successfully, generating (304) the native form of the artificial intelligence development platform by loading a resource file; after the resource file is loaded successfully to generate the native form, generating (305) the intermediate result; processing (306) the generated intermediate result; determining (307) whether execution of the domain-specific language code is completed; and exiting (308) the production line executor in response to determining that the execution of the domain-specific language code is completed, or repeating the operations 304-306 in response to determining that the execution of the domain-specific language code is not completed.

According to some embodiments of the present disclosure, the request from the second client 140 may be, for example, a request to execute the newly added customized artificial intelligence production line 138 on the second server 130 (specifically, the artificial intelligence development platform 132) by inputting a certain URL address through the web browser 144 or clicking a certain option on the page of the artificial intelligence development platform 132 by the consumer 104. The execution of the customized artificial intelligence production line 138 may be based on its download and installation. In an example, the customized artificial intelligence production line 138 may be downloaded and installed in two ways for subsequent execution: the consumer 104 accesses the artificial intelligence development platform 132 on the second server 130 through the web browser 144 and clicks, for example, a download option button or an installation option button associated with the customized artificial intelligence production line 138 to implement download and installation; or the consumer 104 may download and install the customized artificial intelligence production line 138 directly from, for example, an application store. After receiving the request to execute the customized artificial intelligence production line 138, the production line executor 134 starts (301) and loads (302) the platform environment configuration file. If the loading is successful, subsequent operations may be executed to generate a native form, which is sent to the second client 140 to present the native interactive page of the artificial intelligence development platform 132. In some examples, in the context of FIG. 1, after the resource file is successfully loaded to generate the native form, the generated native form may be sent to the second client 140 accessing the artificial intelligence development platform 132 through, for example, a Web server (for example, Nginx, not shown in FIG. 1) residing on the second server 130, thereby presenting an interactive page native to the artificial intelligence development platform 132 on the second client 140. The consumer 104 of the client may operate on the native interactive page, such as filling in a form and submitting the completed form to the Web server. If the platform environment configuration file cannot be loaded since the file is missing or damaged, the production line executor 134 is exited. At this time, the consumer 104 cannot use the customized production line 138, and an error page may be displayed in an interface corresponding to the artificial intelligence development platform 132.

According to other embodiments of the present disclosure, the production line executor is configured to generate (304) the native form of the artificial intelligence development platform by loading the resource file in response to determining that the platform environment configuration file is loaded successfully. This may include: loading (3044) the resource file and determining (3046) whether the resource file is loaded successfully.

According to other embodiments of the present disclosure, the production line executor is configured to generate (305) the intermediate result after the resource file is loaded successfully to generate the native form. This may include executing the following operations:

monitoring (3052) an operation event on the native interactive page from the second client. For example, when the consumer accesses a certain native interactive page through a web browser, inputs basic information in a text box, inputs desired information in a search box, clicks a certain link on the page and clicks a submit button to submit a data set, etc., corresponding operation events will occur. In some examples, a Web server such as Nginx (engine X) can be used to detect whether an operation event occurs on the native interactive page of the client. There may be a communication interface between the production line executor and the Web server, which is different from the standardized platform interface. When the Web server detects that the operation event occurs on the native interactive page, the operation event may be sent to the production line executor through the communication interface. Therefore, the production line executor can monitor the operation event on the native interactive page from the second client.

determining (3054) whether the monitored operation event is a form submission event, where the form submission event indicates that required item data on the native interactive page has been collected from the second client. In an example, the production line executor may verify whether the filled data path is legal, whether the format is correct, and so on. The operation events received from the Web server include form submission events and non-form submission events. The form submission event refers to an event that occurs when buttons such as an OK button and a submit button in the form are clicked. Forms submitted through, for example, Form, jQuery, Ajax and the like may include the required data such as a scenario data set related to a scenario requirement of the consumer. The non-form submission event refers to other events except for the form submission event, such as a mouse click event, an event that occurs when an object loses focus (for example, the mouse leaves the input box), an event that occurs when the object obtains the focus (for example, the mouse is placed in the input box), an event that occurs when the value of the object changes, etc.

executing (3056) the processing logic, defined in the file set, corresponding to the form submission event with the required field data in response to determining that the operation event is the form submission event. For example, when the data set submitted by the consumer has been collected by the form submission event, the corresponding logic may be executed to perform corresponding model training according to the collected data set to generate a customized training model. When it is determined that the operation event is a non-form submission event, it means that the operation on the form has not ended, and the data set related to the consumer has not been collected. At this time, the processing logic, defined in the file set, corresponding to the non-form submission event is executed, for example, the processing logic is executed to change the background color of the object when the object obtains the focus, and the processing logic is executed to convert the object to capitals when the value of the object changes. Then, the operation event is continuously monitored until the monitored operation event is the form submission event.

Through the above operations, the consumer may be provided with the interactive experience of the native form, and the consumer may input various types of information, including the data set, related to their own scenario requirement through the native form.

According to other embodiments of the present disclosure, the production line executor is configured to process (306) the generated intermediate result. This may include executing the following operations after the operation of executing the processing logic corresponding to the form submission event: storing (3062) the intermediate result, wherein the intermediate result may include an intermediate result (for example, Artifact) such as the data set and the training model generated when the processing logic corresponding to the form submission event is executed, and may also include metadata describing data attribute, such as the physical position of the data set, the name and field of the data set, a data access log and the like; and sending (3064) the intermediate result to the artificial intelligence development platform through the standardized platform interface for further processing.

It will be further described below in combination with the embodiments how to use the standardized platform interface to implement the interaction between the production line executor and the artificial intelligence development platform, including sending the intermediate result to the artificial intelligence development platform.

According to some embodiments of the present disclosure, the standardized platform interface includes a data type interface for the production line executor to execute the operation of reading and writing on a training data set for the artificial intelligence development platform; a model type interface for the production line executor to execute the operation of reading and writing on an artificial intelligence model for the artificial intelligence development platform; a configuration type interface for the production line executor to execute the operation of reading and writing on a configuration variable for the artificial intelligence development platform; and a status type interface for the production line executor to execute the operation of reading and writing on a task status for the artificial intelligence development platform. The interaction between the production line executor and the artificial intelligence development platform may be implemented through these interfaces.

As shown in Table 1 below, each type of interface includes an interface for the reading operation such as GetDataSet, GetModel, GetTaskStatus and GetConfig, and an interface for the writing operation such as SetDataSet, SetModel, SetTaskStatus and SetConfig. By calling a function corresponding to the interface for the reading operation, the production line executor may, for example, read the training data set, the artificial intelligence model, the platform configuration variable and the task status of the platform from the artificial intelligence development platform side. By calling a function corresponding to the interface for the writing operation, the production line executor may, for example, send the intermediate result from the customized production line to the artificial intelligence development platform, thereby avoiding direct intrusive operations on the data set of the artificial intelligence development platform.

When the function corresponding to the interface name is called, a specific return structure will be obtained whenever a specific input parameter is given, so that related information on the corresponding data, model, configuration, status and the like will be acquired. Taking the reading operation through the data type interface as an example, the input parameter includes a parameter UserID indicating the selected artificial intelligence development platform, a parameter Token: {AK: String; SK: String} indicating whether the production line executor has the authority to call the standardized platform interface to access the selected artificial intelligence development platform, and a parameter DSID (DataSetID) indicating the data set accessed by the production line executor. The return structure includes a result ErrID (ErrorID) indicating an error code, a result ErrMsg (ErrorMessage) indicating error information, a result DSPath (DataSetPath) indicating a data set storage path, a result DSMetaPath (DataSetMetadataPath) indicating a metadata storage path and a result DSType (DataSetType) indicating a type of the data set.

TABLE 1

| Interface Classification | Interface Name | Return Structure | Input Parameter |
|---|---|---|---|
| Data type | GetDataSet | {ErrID: Int64; ErrMsg: String; DSPath: String; DSMetaPath: String; DSType: String} | {UserID: Int64; Token: {AK: String; SK: String}; DSID: Int64} |
| | SetDataSet | {ErrID: Int64; ErrMsg: String; DSID: Int64} | {UserID: Int64; Token: {AK: String; SK: String}; DSPath: String; DSMetaPath: String; DSType: String; DSSize: Int64; DSCount: Int64} |
| Model type | GetModel | {ErrID: Int64; ErrMsg: String; ModPath: String; ModType: String} | {UserID: Int64; Token: {AK: String; SK: String}; ModID: Int64} |
| | SetModel | {ErrID: Int64; ErrMsg: String; ModID: Int64} | {UserID: Int64; Token: {AK: String; SK: String}; ModPath: String; ModType: String} |
| Configuration type | GetConfig | {ErrID: Int64; ErrMsg: String; Conf: Dict<Key: String, Value: String>} | {UserID: Int64; Token: {AK: String; SK: String}; ConfID: Int64} |
| | SetConfig | {ErrID: Int64; ErrMsg: String; ConfID: Int64} | {UserID: Int64; Token: {AK: String; SK: String}; Conf: Dict <Key: String, Value: String>} |
| Status type | GetTaskStatus | {ErrID: Int64; ErrMsg: String; TaskStatus: Int64; TaskInfo: String} | {UserID: Int64; Token: {AK: String; SK: String}; TaskID: Int64} |
| | SetTaskStatus | {ErrID: Int64; ErrMsg: String; TaskID: Int64} | {UserID: Int64; Token: {AK: String; SK: String}; TaskStatus: Int64; TaskInfo: String} |

The standardized platform interface may be implemented using various interfaces based on specific protocols. According to some embodiments of the present disclosure, the standardized platform interface may be implemented using a Restful application programming interface (API). In some examples, the standardized platform interface may support communication based on an HTTP protocol.

Through the standardized platform interface described above, a unified standard execution environment and service interface may be provided, so that the customized production line can be created in one place and run in multiple places (on multiple different artificial intelligence development platforms), thereby facilitating reuse in similar scenarios without investing additional research and development manpower for building or modification and adaptation.

It should be noted that the standardized platform interface according to the present disclosure may include service interfaces for any key link involved in the process of executing the customized production line, such as data processing, model training, and service deployment, including but not limited to the above four types of interfaces. In addition, the standardized platform interface according to the present disclosure may also be implemented using other interfaces based on specific protocols, such as an RPC interface.

Figure 4:
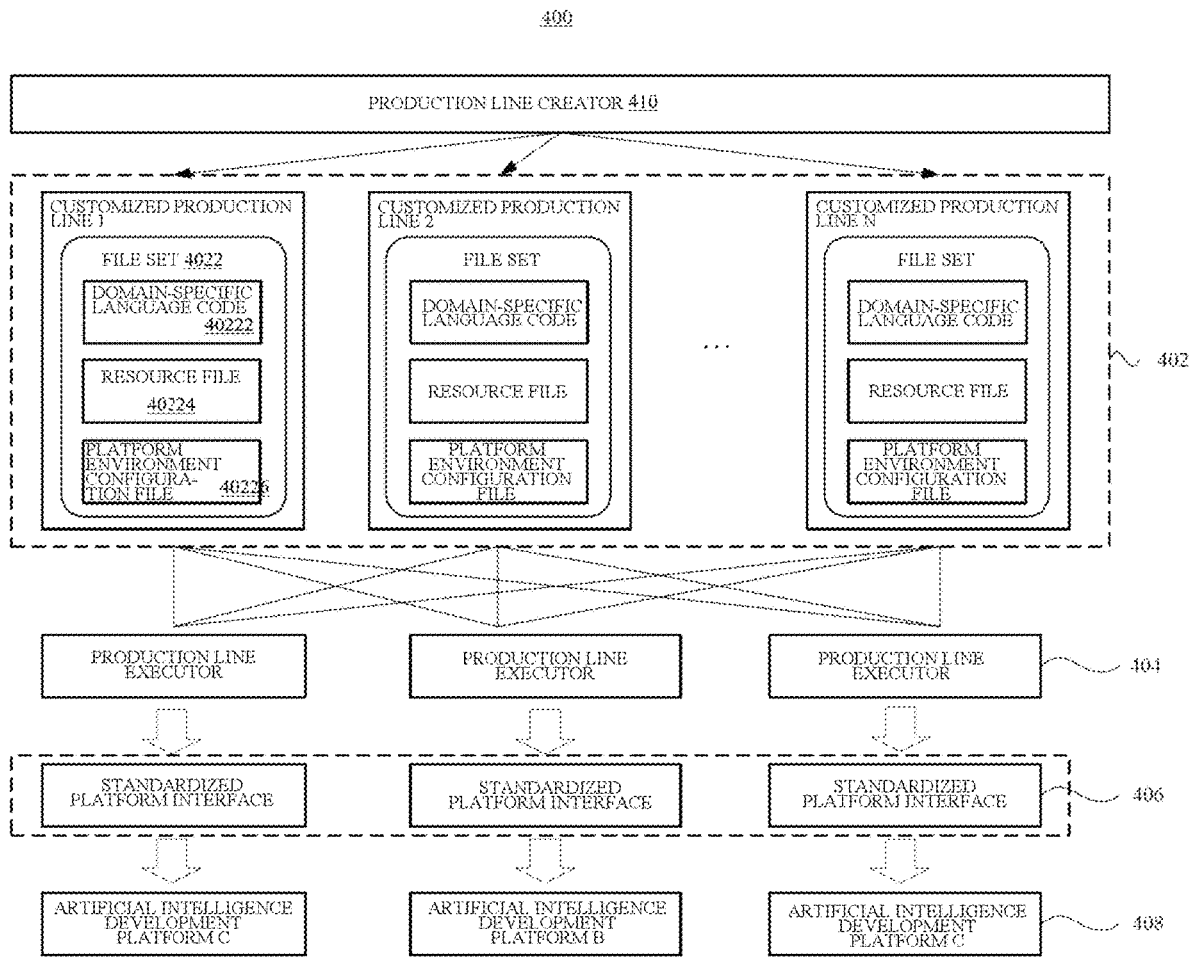
FIG. 4 is a structural block diagram illustrating an apparatus for executing a customized production line using an artificial intelligence development platform according to another example embodiment of the present disclosure.

FIG. 4 illustrates a structural block diagram of an apparatus 400 for executing a customized production line using an artificial intelligence development platform according to another example embodiment of the present disclosure. Reference numerals similar to those in FIG. 2 indicate the same elements.

In this embodiment, the apparatus 400 further includes a production line creator 410 compared with the apparatus 200 in FIG. 2. The production line creator 410 is configured to generate an interactive development interface for editing, previewing and debugging the customized production line so as to create the customized production line. In some examples, the production line creator 410 may be implemented based on an open-source integrated development environment such as Jupyter, and its interface may reuse the interface of JupyterLab and be loaded in the JupyterLab in the form of a plug-in.

Figure 5:
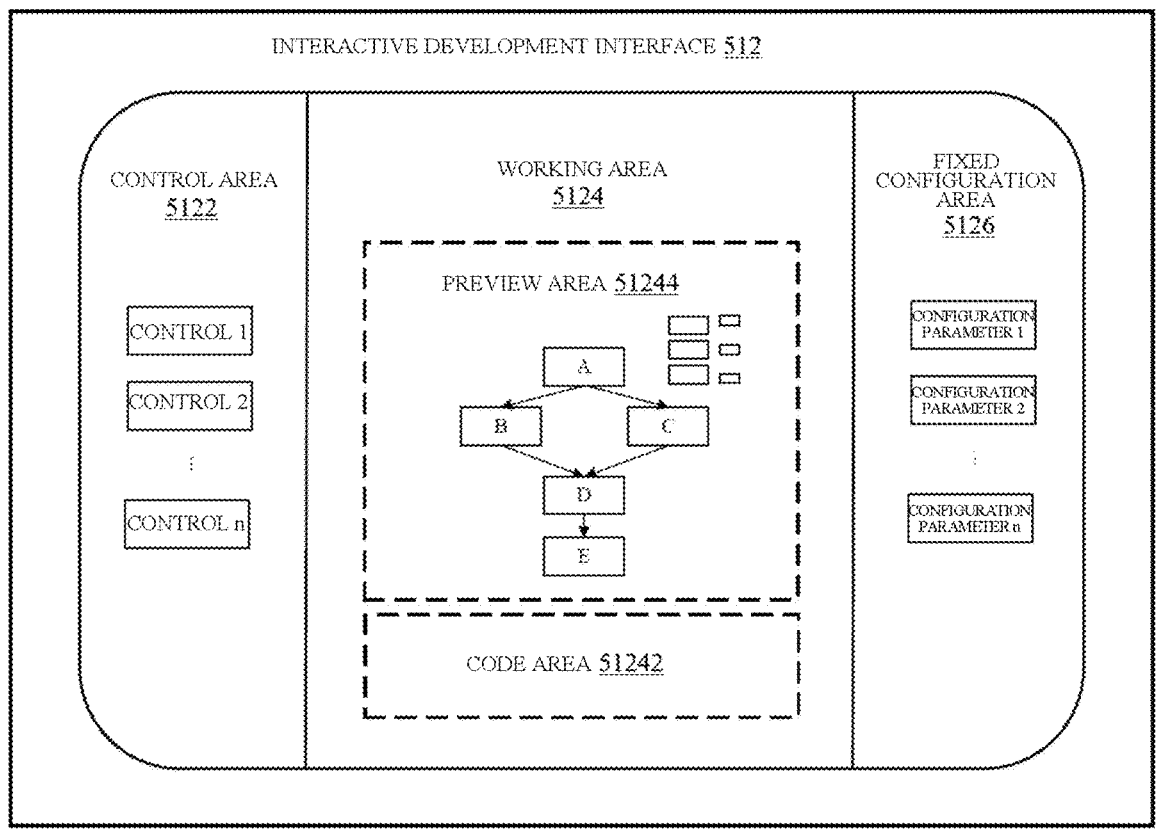
FIG. 5 is an example interactive development interface illustrating a production line creator according to an example embodiment of the present disclosure.

FIG. 5 illustrates an example interactive development interface of a production line creator 410. For the purpose of illustration, the production line creator 410 in the apparatus 400 will be further described below in combination with FIG. 4 and FIG. 5.

Referring to FIG. 5, the interactive development interface 512 of the production line creator 410 includes a control area 5122, a working area 5124 and a fixed configuration area 5126. The control area 5122 is to edit a plurality of controls of the native form, where the plurality of controls may be Web controls defined in a standard specification (for example, HTML5). The working area 5124 includes a code area 51242 for editing codes describing the processing logic of the additional development process, and a preview area 51244 for previewing the customized production line. In some examples, the code area 51242 may use, for example, an open-source language server protocol (LSP) to implement functions such as syntax highlighting and automatic supplementing of a python code; and the preview area 51244 may use, for example, Canvas of HTML5 for rendering so as to generate a preview. The fixed configuration area 5126 is used to edit the configuration parameters applied to the artificial intelligence development platform through, for example, a standard Web form control.

Through the collaboration of the above three areas in the production line creator, the producer can not only edit and run the code directly in the interactive development interface, but also display the running result of the code in the same interface, and create the customized production line through visual drag and drop. As a result, inconvenient operation caused by editing the code and previewing the running result of the code in multiple interfaces is avoided, the debugging process of the customized production line is accelerated, and the producer is provided with a good user experience.

According to some embodiments, referring to FIG. 1, the production line creator 118 may be configured to be deployed at the side of the first client 110, and the production line executor 134 and the standardized platform interface 136 are configured to be deployed at a different side compared with the production line creator, that is, deployed at the server side together with the artificial intelligence development platform 132. In this case, the production line creator exists in an independent form (for example, as a software tool at the side of the first client 110). In such an embodiment, the production line creator may be implemented to reside locally at the side of the first client 110, or may be implemented to reside on a cloud platform that may be accessed via the first client 110. According to other embodiments, the production line creator, the production line executor and the standardized platform interface may be configured to be deployed at the server side together with the artificial intelligence development platform. In this case, the production line creator exists in a dependent form as a function of the artificial intelligence development platform open to the consumer.

It should be noted that in the apparatus 400 shown in FIG. 4, the operations executed by other components and/or modules such as the customized production line 402, the production line executor 404, the standardized platform interface 406 and the artificial intelligence development platform 408 except for the production line creator 410 are same as or similar to those executed by the corresponding components and/or modules described in combination with FIG. 2, which will not be described in detail here.

In addition, although specific functions are discussed above with reference to specific modules, it should be noted that the functions of each module discussed herein may be divided into a plurality of modules, or/and at least some functions of a plurality of modules may be combined into a single module. Executing an action by the specific module discussed herein includes executing the action by the specific module itself, or alternatively, calling or otherwise accessing another component or module that executes the action by the specific module (or executing the action in combination with the specific module). Therefore, the specific module that executes the action may include the specific module itself that executes the action and/or another module that is called or otherwise accessed by the specific module to execute the action. For example, the production line executor 204 and the artificial intelligence development platform 208 described above may be combined into a single module in some embodiments.

More generally, various technologies may be described herein in the general context of software and hardware elements or program modules. Various modules described above with respect to FIGS. 2-5 may be implemented in hardware or in hardware in combination with software and/or firmware. For example, these modules may be implemented as computer program codes/instructions, which are configured to be executed in one or more processors and stored in a computer readable storage medium. Alternatively, these modules may be implemented as hardware logic/circuit. For example, in some embodiments, one or more of the production line creator 410, the production line executor 404 and the artificial intelligence development platform 408 may be implemented together in a system on chip (SoC). The SoC may include an integrated circuit chip (including a processor (for example, a central processing unit (CPU), a microcontroller, a microprocessor, a digital signal processor (DSP) and the like), a memory, one or more communication interfaces, and/or one or more components in other circuits), and may optionally execute the received program code and/or include embedded firmware to execute functions.

Figure 6:
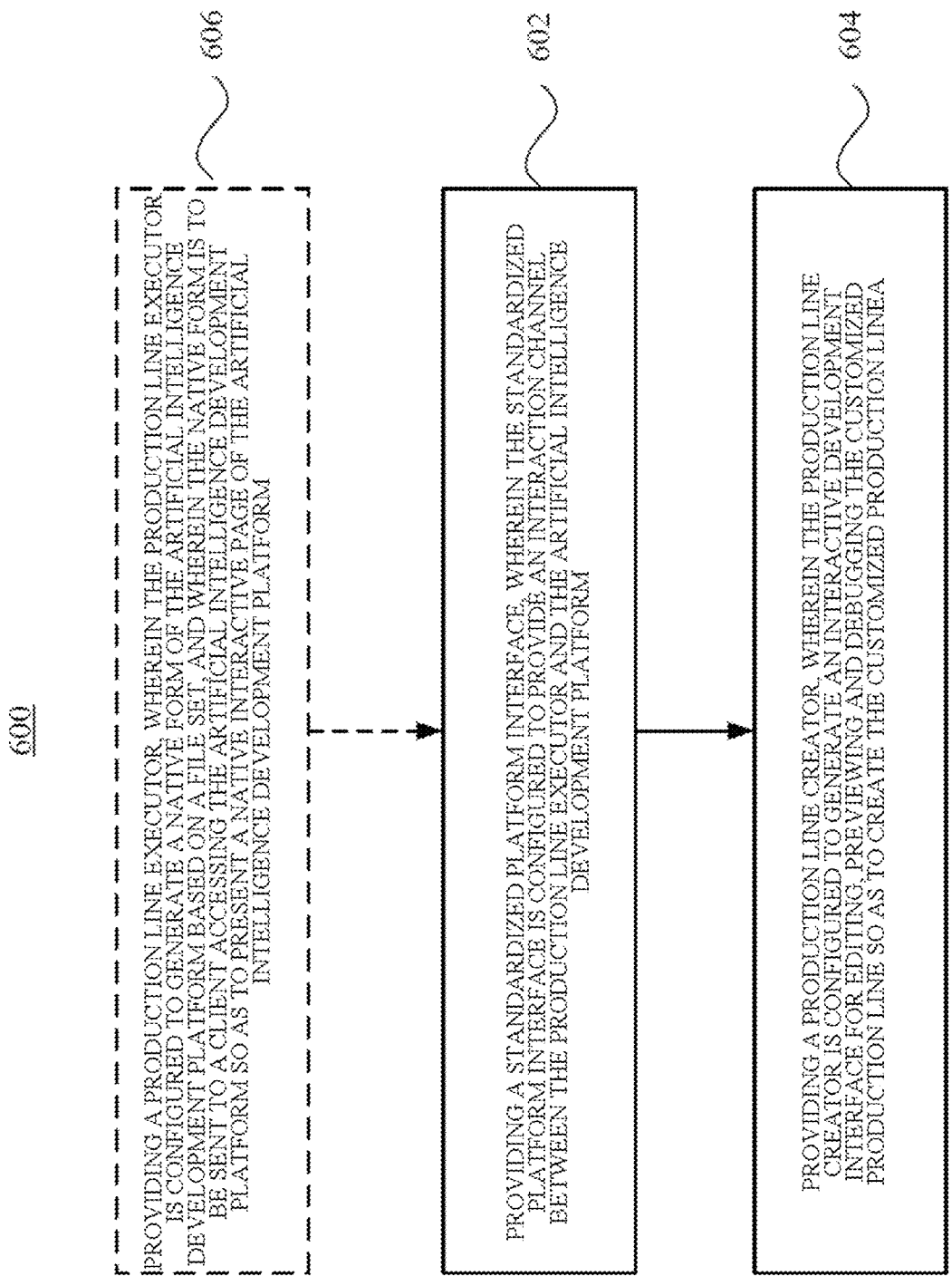
FIG. 6 is a flow chart illustrating a method for executing a customized production line using an artificial intelligence development platform according to an example embodiment of the present disclosure.

FIG. 6 illustrates a structural block diagram of a method 600 for implementing a customized production line for an artificial intelligence development platform according to an example embodiment of the present disclosure.

In step 602, a production line executor is provided. The production line executor is configured to generate a native form of the artificial intelligence development platform based on a file set. The native form is to be sent to a client accessing the artificial intelligence development platform so as to present a native interactive page of the artificial intelligence development platform.

In step 604, a standardized platform interface is provided. The standardized platform interface is configured to provide an interaction channel between the production line executor and the artificial intelligence development platform.

The production line executor is also configured to generate an intermediate result through processing logic, defined in the file set, corresponding to an operation event on the native interactive page, and to process the intermediate result by interacting with the artificial intelligence development platform via the standardized platform interface so as to execute an additional development process.

In an example, the method 600 may further include step 606. In step 606, a production line creator is provided. The production line creator is configured to generate an interactive development interface for editing, previewing and debugging the customized production line, so as to create the customized production line. The created customized production line may be stored and distributed in the format of a compressed packet and/or a mirror image file.

According to another aspect of the present disclosure, a computing device is further provided, which may include: a processor; and a memory storing instructions thereon. The instructions, when executed by the processor, are to implement the functions of the components and/or modules in the above described apparatus 200 or 400.

According to yet another aspect of the present disclosure, a computer readable storage medium storing instructions is further provided, which, when executed by the processor, are to implement the functions of the components and/or modules in the above described apparatus 200 or 400.

Figure 7:
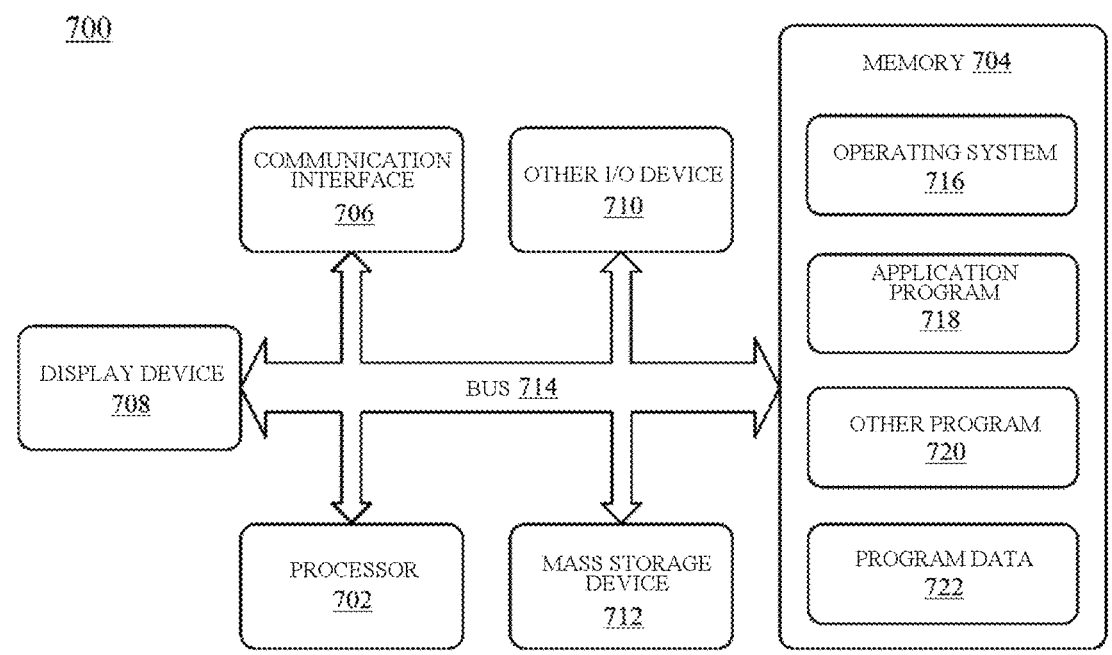
FIG. 7 is a schematic block diagram illustrating an example computing device that can be applied to the implementation of an example embodiment.

Examples of such computing device and computer readable storage medium are described below in combination with FIG. 7. FIG. 7 illustrates an example computing device 700 that can be applied to implement an example embodiment.

The computing device 700 may be a variety of different types of devices, such as a server of a service provider, a device associated with a client (for example, a client device), a system on chip, and/or any other suitable computing device or computing system. An example of the computing device 700 includes, but is not limited to: a desktop computer, a server computer, a notebook computer or a netbook computer, a mobile device (for example, a tablet computer or a phablet device, a cell phone or other wireless phones (for example, a smart phone), a note pad computer and a mobile station), a wearable device (for example, glasses and a watch), a recreation device (for example, a recreation appliance, a set top box and a game machine coupled to a display device communicatively), a television or other display device, an automobile computer and the like. Therefore, the computing device 700 may range from a full-resource device (for example, a personal computer and a game console) with a large amount of memory and processing resources to a low-resource device (for example, a traditional set top box and a handheld game console) with limited memory and/or processing resources.

The computing device 700 may include at least one processor 702, a memory 704, communication interface(s) 706, a display device 708, other input/output (I/O) device 710 and one or more mass storage device 712, which are capable of communicating with each other, for example, through a system bus 714 or other appropriate connection.

The processor 702 may be a single processing unit or a plurality of processing units. All the processing units may include a single or a plurality of computing units or a plurality of cores. The processor 702 may be implemented as one or more microprocessors, microcomputers, microcontrollers, digital signal processors, central processing units, status machines, logic circuits and/or any devices that control signals based on operation instructions. In addition to other capabilities, the processor 702 may be configured to acquire and execute computer readable instructions stored in the memory 704, the mass storage device 712 or other computer readable media, such as program codes of an operating system 716, program codes of an application program 718, program codes of other programs 720 and the like.

The memory 704 and the mass storage device 712 are examples of the computer storage medium storing instructions that are executed by the processor 702 to implement various functions described above. For instance, the memory 704 may generally include both a volatile memory and a non-volatile memory (for example, RAM, ROM and the like). In addition, the mass storage device 712 may generally include a hard disk driver, a solid-state driver, a removable medium including external and removable drivers, a memory card, a flash memory, a floppy disk, a compact disk (for example, CD and DVD), a memory array, network attached storage, a storage area network and the like. The memory 704 and the mass storage device 712 may be collectively referred to herein as a memory or a computer storage medium, and may be a non-transitory medium which is capable of storing the computer readable and processor-executable program instructions as computer program codes. The computer program codes may be executed by the processor 702 as a specific machine configured to implement the operations and functions described in the examples herein A plurality of program modules may be stored on the mass storage device 712. These programs include the operating system 716, one or more application programs 718, other programs 720 and program data 722, and they may be loaded to the memory 704 for execution. Examples of such application programs or program modules may include, for example, computer program logic (for example, computer program codes or instructions) for implementing the following components/functions: the customized production line 402, the production line executor 404, the standardized platform interface 406, the artificial intelligence development platform 408, the production line creator 410, the method 600 (including any suitable steps of the method 600) and/or other embodiments described herein.

Although illustrated in FIG. 7 as being stored in the memory 704 of the computing device 700, modules 716, 718, 720 and 722 or parts thereof may be implemented using any form of computer readable medium which may be accessed by the computing device 700. As used herein, "computer readable medium" at least includes two types of computer readable media, that is, a computer storage medium and a communication medium.

The computer storage medium includes volatile and non-volatile, removable and non-removable media, which are implemented with any method or technology for storing information. The information is, for example, computer readable instructions, a data structure, a program module or other data. The computer storage medium includes but is not limited to RAM, ROM, EEPROM, flash memory or other memory technologies, CD-ROM, a digital versatile disk (DVD), or other optical storage apparatuses, a magnetic box, a magnetic tape, a magnetic disk storage apparatus or other magnetic storage devices, or any other non-transmitting medium which may be used to store information for the computing device to access.

In contrast, the communication medium may specifically implement the computer readable instructions, the data structure, the program module or other data in a modulated data signal such as a carrier wave or other transmission mechanisms. The computer storage medium defined herein does not include the communication medium.

The computing device 700 may further include one or more communication interfaces 706 for exchanging data with other devices through, for example, a network, direction connection and the like as discussed above. Such a communication interface may be one or more of: any type of network interface (for example, a network interface card (NIC)), a wired or wireless (such as IEEE 802.11 wireless LAN (WLAN)) interface, a worldwide interoperability for microwave access (Wi-MAX) interface, an Ethernet interface, a universal serial bus (USB) interface, a cellular network interface, a Bluetooth™ interface, a near-field communication (NFC) interface and the like. The communication interface 706 may facilitate communication in various networks and protocol types, including a wired network (for example LAN, cable and the like), a wireless network (for example WLAN, cellular, satellite and the like), the Internet and the like. The communication interface 706 may further provide communication with an external storage apparatus (not shown) in such as a storage array, network attached storage, a storage area network and the like.

In some examples, a display device 708 such as a monitor may be included for displaying information and images to a user. Other I/O device 710 may be a device that receives various inputs from the user and provides various outputs to the user, and may include a touch input device, a gesture input device, a video camera, a keyboard, a remote controller, a mouse, a printer, an audio input/output device and the like.

Although the present disclosure has been illustrated and described in detail in combination with the drawings and the foregoing description, such illustration and description should be considered as illustrative and schematic, rather than limited; and the present disclosure is not limited to the disclosed embodiments. By studying the drawings, the disclosure and the appended claims, those skilled in the art can understand and implement variations to the disclosed embodiments when practicing the claimed subject matters. In the claims, the word "comprising" does not exclude other elements or steps not listed, the indefinite article "a" or "an" does not exclude a plurality, and the term "a plurality of" means two or more. The mere fact that certain measures are recited in mutually different dependent claims does not indicate that a combination of these measures cannot be used to obtain a benefit.

What is claimed is:

1. A computer-implemented method for executing a customized production line using an artificial intelligence development platform, wherein the customized production line is an additional development process that is different from a pre-defined development process of the artificial intelligence development platform, and wherein the additional development process is defined by a file set, the computer-implemented method comprising:

generating, by one or more processors, a native form of the artificial intelligence development platform based on the file set, wherein the native form of the artificial intelligence development platform is to be sent to a client accessing the artificial intelligence development platform to present a native interactive page of the artificial intelligence development platform, wherein the file set comprises a platform environment configuration file comprising a configuration parameter, corresponding to the additional development process, for the artificial intelligence development platform;

providing, by the one or more processors, a standardized platform interface corresponding to the artificial intelligence development platform;

loading, by the one or more processors, the platform environment configuration file in response to receiving a request from the client to configure the artificial intelligence development platform according to the configuration parameter;

generating, by the one or more processors, the native form of the artificial intelligence development platform by loading a resource file of the file set after the platform environment configuration file is loaded successfully; and after the resource file is loaded successfully, generating, by the one or more processors, an intermediate result by executing processing logic, defined in the file set, corresponding to an operation event on the native interactive page and to process the intermediate result by interacting with the artificial intelligence development platform via the standardized platform interface to execute the additional development process, wherein the generating the intermediate result comprises:

monitoring an operation event on the native interactive page from the client;

determining whether the monitored operation event is a form submission event, wherein the form submission event indicates that required item data on the native interactive page has been collected from the client; and executing processing logic, defined in the file set, corresponding to the form submission event with the required item data in response to determining that the operation event is the form submission event.

2. The computer-implemented method according to claim 1, wherein the file set further comprises:

a domain-specific language code comprising a code that is described in a domain-specific language for implementing processing logic of the additional development process; and the resource file comprising a style sheet and a picture required for presenting the native interactive page.

3. The computer-implemented method according to claim 2, wherein the code for implementing the processing logic of the additional development process comprises code logic for executing at least one of form control event response, multi-source training data processing, or multi-model fusion calculation.

4. The computer-implemented method according to claim 1, further comprising:
  after executing the processing logic corresponding to the form submission event, processing the intermediate result, wherein the processing the intermediate result comprises:
    storing the intermediate result; and
    sending the intermediate result to the artificial intelligence development platform through the standardized platform interface.

5. The computer-implemented method according to claim 1, wherein the standardized platform interface comprises:
  a data type interface, for reading and writing on a training data set for the artificial intelligence development platform;
  a model type interface, for reading and writing on an artificial intelligence model for the artificial intelligence development platform;
  a configuration type interface, for reading and writing on a configuration variable for the artificial intelligence development platform; and
  a status type interface, for-reading and writing on a task status for the artificial intelligence development platform.

6. The computer-implemented method according to claim 5, wherein the standardized platform interface is implemented through a Restful application programming interface.

7. The computer-implemented method according to claim 1, further comprising:
  generating an interactive development interface for editing, previewing and debugging the customized production line to create the customized production line.

8. The computer-implemented method according to claim 7, wherein the interactive development interface comprises:
  a control area to edit a plurality of controls of the native form of the artificial intelligence development platform;
  a working area comprising a code area for editing a code describing processing logic of the additional development process;
  a preview area for previewing the customized production line; and
  a fixed configuration area to edit a configuration parameter applied to the artificial intelligence development platform.

9. The computer-implemented method according to claim 7, wherein the interactive development interface is configured to be deployed at a client side, and the standardized platform interface is configured to be deployed at a server side together with the artificial intelligence development platform.

10. The computer-implemented method according claim 7, wherein the interactive development interface and the standardized platform interface are configured to be deployed at a server side together with the artificial intelligence development platform.

11. The computer-implemented method according to claim 1, further comprising:
  storing and distributing the created customized production line in a format comprising at least one selected from a group consisting of a compressed packet and a mirror image file.

12. A computing device for executing a customized production line using an artificial intelligence development platform, wherein the customized production line is an additional development process that is different from a pre-defined development process of the artificial intelligence development platform, and wherein the additional development process is defined by a file set, the computing device comprising:
  a processor; and
  a memory having instructions stored thereon, wherein the instructions are executable by the processor for:
    generating a native form of the artificial intelligence development platform based on the file set, wherein the native form of the artificial intelligence development platform is to be sent to a client accessing the artificial intelligence development platform to present a native interactive page of the artificial intelligence development platform, wherein the file set comprises a platform environment configuration file comprising a configuration parameter, corresponding to the additional development process, for the artificial intelligence development platform;
    providing a standardized platform interface corresponding to the artificial intelligence development platform;
    loading the platform environment configuration file in response to receiving a request from the client to configure the artificial intelligence development platform according to the configuration parameter;
    generating the native form of the artificial intelligence development platform by loading a resource file of the file set after the platform environment configuration file is loaded successfully; and
    after the resource file is loaded successfully, generating an intermediate result by executing processing logic, defined in the file set, corresponding to an operation event on the native interactive page and to process the intermediate result by interacting with the artificial intelligence development platform via the standardized platform interface to execute the additional development process, wherein the generating the intermediate result comprises:
      monitoring an operation event on the native interactive page from the client;
      determining whether the monitored operation event is a form submission event, wherein the form submission event indicates that required item data on the native interactive page has been collected from the client; and
      executing processing logic, defined in the file set, corresponding to the form submission event with the required item data in response to determining that the operation event is the form submission event.

13. The computing device according to claim 12, wherein the instructions are further executable by the processor for:
  generating an interactive development interface for editing, previewing and debugging the customized production line so as to create the customized production line.

14. The computing device according to claim 12, wherein the instructions are further executable by the processor for:
  storing and distributing the created customized production line in a format comprising at least one selected from a group consisting of a compressed packet and a mirror image file.

15. A non-transitory computer readable storage medium for executing a customized production line using an artificial intelligence development platform, wherein the customized production line is an additional development process that is different from a pre-defined development process of the artificial intelligence development platform, and wherein the additional development process is defined by a file set, the non-transitory computer readable storage medium having instructions stored thereon, wherein the instructions are executable by a processor for:

generating a native form of the artificial intelligence development platform based on the file set, wherein the native form of the artificial intelligence development platform is to be sent to a client accessing the artificial intelligence development platform to present a native interactive page of the artificial intelligence development platform, wherein the file set comprises a platform environment configuration file comprising a configuration parameter, corresponding to the additional development process, for the artificial intelligence development platform;

providing a standardized platform interface corresponding to the artificial intelligence development platform;

loading the platform environment configuration file in response to receiving a request from the client to configure the artificial intelligence development platform according to the configuration parameter;

generating the native form of the artificial intelligence development platform by loading a resource file of the file set after the platform environment configuration file is loaded successfully; and after the resource file is loaded successfully, generating an intermediate result by executing processing logic, defined in the file set, corresponding to an operation event on the native interactive page and to process the intermediate result by interacting with the artificial intelligence development platform via the standardized platform interface so as to execute the additional development process, wherein the generating the intermediate result comprises:

monitoring an operation event on the native interactive page from the client;

determining whether the monitored operation event is a form submission event, wherein the form submission event indicates that required item data on the native interactive page has been collected from the client; and executing processing logic, defined in the file set, corresponding to the form submission event with the required item data in response to determining that the operation event is the form submission event.

16. The non-transitory computer readable storage medium according to claim 15, wherein the instructions are further executable by the processor for:

generating an interactive development interface for editing, previewing and debugging the customized production line to create the customized production line.

17. The non-transitory computer readable storage medium according to claim 15, wherein the instructions are further executable by the processor for:

storing and distributing the created customized production line in a format comprising at least one selected from a group consisting of a compressed packet and a mirror image file.

\* \* \* \* \*

UNITED STATES PATENT AND TRADEMARK OFFICE
CERTIFICATE OF CORRECTION

| | | |
|---|---|---|
| PATENT NO. | : 11,954,011 B2 | |
| APPLICATION NO. | : 17/627090 | |
| DATED | : April 9, 2024 | |
| INVENTOR(S) | : Xie et al. | |

It is certified that error appears in the above-identified patent and that said Letters Patent is hereby corrected as shown below:

On the Title Page

Please delete the Title Pages and insert the attached Title Pages, showing the corrected number of claims.

In the Claims

Claim 1: Column 18, Lines 16-20: "wherein the file set comprises a platform environment configuration file comprising a configuration parameter, corresponding to the additional development process, for the artificial intelligence development platform" should read -- wherein the file set comprises a domain-specific language code and a platform environment configuration file, wherein the platform environment configuration file comprises a configuration parameter, corresponding to the additional development process, for the artificial intelligence development platform, and wherein the domain-specific language code comprises a code that is described in a domain-specific language for implementing processing logic of the additional development process, wherein the code for implementing the processing logic of the additional development process comprises code logic for executing at least one of form control event response, multi-source training data processing, or multi-model fusion calculation --.

Claim 2: Column 18, Lines 56-59: "a domain-specific language code comprising a code that is described in a domain-specific language for implementing processing logic of the additional development process; and" should be deleted.

Claim 3: Column 18, Lines 62-67: "3. The computer-implemented method according to claim 2, wherein the code for implementing the processing logic of the additional development process comprises code logic for executing at least one of form control event response, multi-source training data processing, or multi-model fusion calculation." should be deleted.

Claim 5: Column 19, Line 12: "wherein the standardized platform interface comprises" should read -- wherein the standardized platform interface running on the one or more processors comprises: --.

Signed and Sealed this
Twenty-fifth Day of February, 2025

Coke Morgan Stewart
*Acting Director of the United States Patent and Trademark Office*

CERTIFICATE OF CORRECTION (continued)
U.S. Pat. No. 11,954,011 B2

Claim 8: Column 19, Line 35: "wherein the interactive development interface comprises" should read -- wherein the interactive development interface running on the one or more processors comprises --.

Claim 12: Column 20, Lines 14-18: "wherein the file set comprises a platform environment configuration file comprising a configuration parameter, corresponding to the additional development process, for the artificial intelligence development platform" should read -- wherein the file set comprises a domain-specific language code and a platform environment configuration file, wherein the platform environment configuration file comprises a configuration parameter, corresponding to the additional development process, for the artificial intelligence development platform, and wherein the domain-specific language code comprises a code that is described in a domain-specific language for implementing processing logic of the additional development process, wherein the code for implementing the processing logic of the additional development process comprises code logic for executing at least one of form control event response, multi-source training data processing, or multi-model fusion calculation --.

Claim 13: Column 20, Line 55: "line so as to create" should read -- line to create --.

Claim 15: Column 21, Lines 11-15: "wherein the file set comprises a platform environment configuration file comprising a configuration parameter, corresponding to the additional development process, for the artificial intelligence development platform" should read -- wherein the file set comprises a domain-specific language code and a platform environment configuration file, wherein the platform environment configuration file comprises a configuration parameter, corresponding to the additional development process, for the artificial intelligence development platform, and wherein the domain-specific language code comprises a code that is described in a domain-specific language for implementing processing logic of the additional development process, wherein the code for implementing the processing logic of the additional development process comprises code logic for executing at least one of form control event response, multi-source training data processing, or multi-model fusion calculation --.

Claim 15: Column 22, Line 2: "platform interface so as to execute" should read -- platform interface to execute --.

(12) United States Patent
Xie et al.

(10) Patent No.: US 11,954,011 B2
(45) Date of Patent: Apr. 9, 2024

(54) APPARATUS AND METHOD FOR EXECUTING CUSTOMIZED ARTIFICIAL INTELLIGENCE PRODUCTION LINE

(71) Applicant: BEIJING BAIDU NETCOM SCIENCE AND TECHNOLOGY CO., LTD., Beijing (CN)

(72) Inventors: Yongkang Xie, Beijing (CN); Ruyue Ma, Beijing (CN); Zhou Xin, Beijing (CN); Hao Cao, Beijing (CN); Kuan Shi, Beijing (CN); Yu Zhou, Beijing (CN); Yashuai Li, Beijing (CN); En Shi, Beijing (CN); Zhiquan Wu, Beijing (CN); Zihao Pan, Beijing (CN); Shupeng Li, Beijing (CN); Mingren Hu, Beijing (CN); Tian Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 275 days.

(21) Appl. No.: 17/627,090

(22) PCT Filed: Oct. 28, 2020

(86) PCT No.: PCT/CN2020/124460
§ 371 (c)(1),
(2) Date: Jan. 13, 2022

(87) PCT Pub. No.: WO2022/000888
PCT Pub. Date: Jan. 6, 2022

(65) Prior Publication Data
US 2022/0253372 A1    Aug. 11, 2022

(30) Foreign Application Priority Data
Jun. 30, 2020    (CN) .......................... 202010621819.5

(51) Int. Cl.
*G06F 9/44* (2018.01)
*G06F 8/20* (2018.01)
(Continued)

(52) U.S. Cl.
CPC ............ *G06F 11/3624* (2013.01); *G06F 8/20* (2013.01); *G06F 8/35* (2013.01); *G06F 8/433* (2013.01); *G06F 9/44505* (2013.01)

(58) Field of Classification Search
CPC .......... G06F 11/3624; G06F 8/20; G06F 8/35; G06F 8/433; G06F 9/44505
See application file for complete search history.

(56) References Cited

U.S. PATENT DOCUMENTS 10,620,923 B2    4/2020    Allan et al.
10,832,173 B1 *  11/2020   Pistoia ................ G06F 40/216
(Continued)

FOREIGN PATENT DOCUMENTS

CN    106959851 A    7/2017
CN    107807814 A    3/2018
(Continued)

OTHER PUBLICATIONS

Xifan Yao, From Intelligent Manufacturing to Smart Manufacturing for Industry 4.0 Driven by Next Generation Artificial Intelligence and Further On, 2017, pp. 1-8. https://ieeexplore.ieee.org/stamp/stamp.jsp?tp=&arnumber=8119409 (Year: 2017).*
Resende, Luciano. "IBM announces Elyra AI Toolkit, a set of AI-centric extensions to Jupyter Notebooks," *IBM Developer Blog* (Apr. 29, 2020) (available at: https://developer.ibm.com/blogs/opensource-elyra-ai-toolkit-simplifies-data-model-developemnt/) (downloaded on Jan. 13, 2022).
(Continued)

*Primary Examiner* — Mongbao Nguyen
(74) *Attorney, Agent, or Firm* — Leydig, Voit & Mayer, Ltd.

(57) ABSTRACT

An apparatus and a method for executing a customized production line using an artificial intelligence development platform, a computing device and a computer readable storage medium are provided. The apparatus includes: a
(Continued)

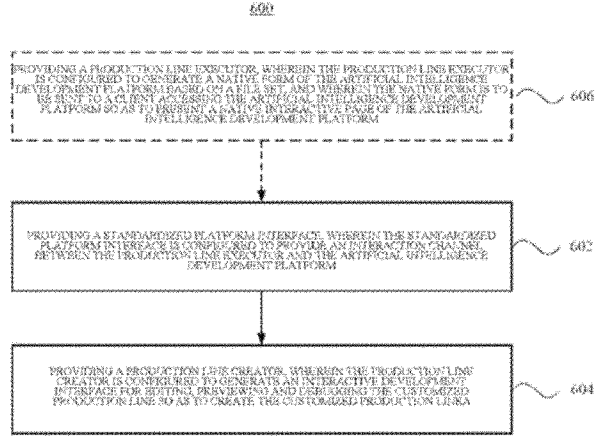

production line executor configured to generate a native form of the artificial intelligence development platform based on a file set, the native form to be sent to a client accessing the artificial intelligence development platform so as to present a native interactive page of the artificial intelligence development platform; and a standardized platform interface configured to provide an interaction channel between the production line executor and the artificial intelligence development platform. The production line executor is further configured to generate an intermediate result by executing processing logic defined in the file set and to process the intermediate result by interacting with the artificial intelligence development platform via the standardized platform interface.

16 Claims, 7 Drawing Sheets

(51) Int. Cl.
*G06F 8/35* (2018.01)
*G06F 8/41* (2018.01)
*G06F 9/445* (2018.01)
*G06F 9/455* (2018.01)
*G06F 11/36* (2006.01)

(56) References Cited

U.S. PATENT DOCUMENTS

| | | | |
|---|---|---|---|
| 10,956,833 B1* | 3/2021 | Yamane | G06F 8/77 |
| 11,748,128 B2* | 9/2023 | Chakraborti | G06N 5/043 |
| | | | 717/151 |
| 2021/0191718 A1* | 6/2021 | Draude | G06F 8/77 |

FOREIGN PATENT DOCUMENTS

| | | | |
|---|---|---|---|
| CN | 108874268 A | | 11/2018 |
| CN | 108876435 A | | 11/2018 |
| CN | 110209574 A | * | 9/2019 |
| CN | 110489093 A | | 11/2019 |
| CN | 110780861 A | | 2/2020 |
| CN | 110795095 A | | 2/2020 |
| CN | 111782184 A | | 10/2020 |
| JP | H10105410 A | | 4/1998 |
| JP | 2019-3603 A | | 1/2019 |

OTHER PUBLICATIONS

"Usage of Alibaba Cloud machine learning platform—rapid application of collaborative filtering recommendation algorithm" (Apr. 13, 2016).
"Creating Artificial Intelligence" Deep Learning Image Recognition System, pp. 31-35 (Dec. 2016).

* cited by examiner